Oct. 30, 1962 N. L. LEEK 3,061,669

MULTIPLEX TELEVISION SYSTEM

Filed Nov. 23, 1959

INVENTOR

N. L. Leek

United States Patent Office
3,061,669
Patented Oct. 30, 1962

3,061,669

MULTIPLEX TELEVISION SYSTEM

Nathaniel L. Leek, 10 E. 40th St., Bronxville 16, N.Y.

Filed Nov. 23, 1959, Ser. No. 854,804
3 Claims. (Cl. 178—6.8)

This invention relates to a multiplex television system and has for an object to provide a system in which a second picture signal can be superimposed on a standard television channel without interfering with the reception of the first picture by a standard television receiver.

Another object is to provide a secret television transmission system which can be applied to any standard television transmission channel.

Other objects and advantages will be apparent as the nature of the invention is more fully disclosed.

On the usual television system the receiver tube includes a screen having a fluorescent surface which is energized by the cathode ray to provide a luminescence which persists for a predetermined time after the energizing force has been removed. If the beam scans the screen in the absence of a picture signal the entire area is made to appear luminescent or white in a black and white tube. A picture signal reduces the intensity of the beam to produce a black spot on the screen.

The present invention is based upon the character of the cathode ray tube and provides a signal which does not produce a visible response on the screen of such a tube but can be converted into a television type signal in a special receiver.

In one embodiment the second signal is composed of a series of pulses each of which has a time period shorter than the time of persistence or dwell of the luminescence of the screen after energization by the beam of the cathode ray tube, and has an amplitude greater than that of the signal required to produce a black area on the screen. Successive picture signal pulses are spaced by a time interval equal to the duration of several pulses. However, when passed through a suitable time delay circuit they can be expanded into the form of the usual picture signal.

In this system when the pulse occurs in a white area of the picture produced by the first signal it serves to cut off the cathode ray for a time so short that the fluorescense of the screen is not affected. When the pulse occurs in a black area of the first picture it merely reduces further the bias of the tube in which the beam is already cut off and this produces no visible effect. Hence the pulse signal produces no effect on the television picture which is being received and reproduced in the normal way by a standard receiver.

In order to convert the pulse signal into a picture signal capable of producing an image on the screen of a receiving tube the demodulated carrier containing the usual picture signal and the pulse signal is passed through a cut off circuit in which the lower amplitude picture signal is eliminated leaving only the pulse signal. This is then passed through a delay circuit in which the timing of each pulse is expanded by an amount such that a substantially continuous signal is obtained. This signal has characteristics similar to the usual picture signal and can be applied to a receiver tube of the usual type.

The nature of the invention will be better understood by referring to the following description taken in connection wtih the accompanying drawing in which a specific embodiment has been set forth for purposes of illustration.

Figure 1:
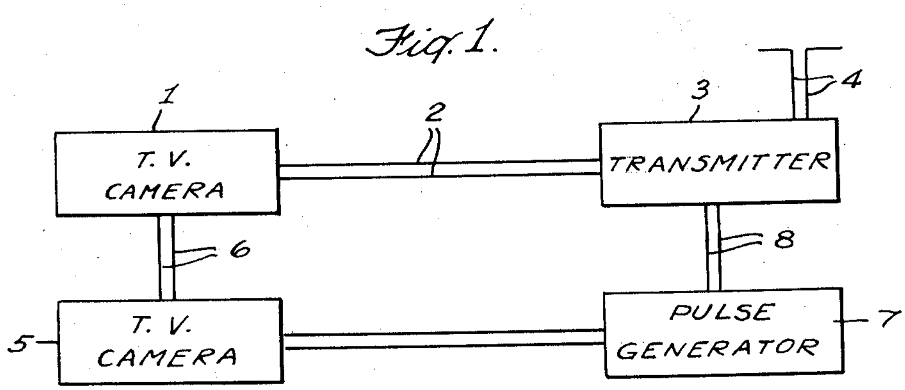
FIG. 1 is a block diagram of a transmitting system embodying the invention.

Referring to the drawing more in detail a standard television camera 1 having means to produce a picture signal and synchronizing signals is connected by lines 2 to modulate a television transmitter 3 which is adapted to supply the modulated carrier wave to an antenna 4 for transmission thereby. A second television camera 5 is synchronized with the camera 1 by lines 6 and is connected to modulate a pulse generator 7 which is adapted to produce radar type pulses of short duration and spaced apart by several pulse lengths. The picture signal from the second camera 5 modulates the pulses from the pulse generator 7 to produce a series of pulses having variations in amplitude representing the picture signal. The modulated pulses are amplified if necessary to an amplitude greater than the maximum amplitude of the picture signal in the lines 2. These modulated pulses are fed by lines 8 to modulate the transmitter 3 whereby the transmitted carrier carries the picture signals from both of the cameras 1 and 5.

Figure 2:
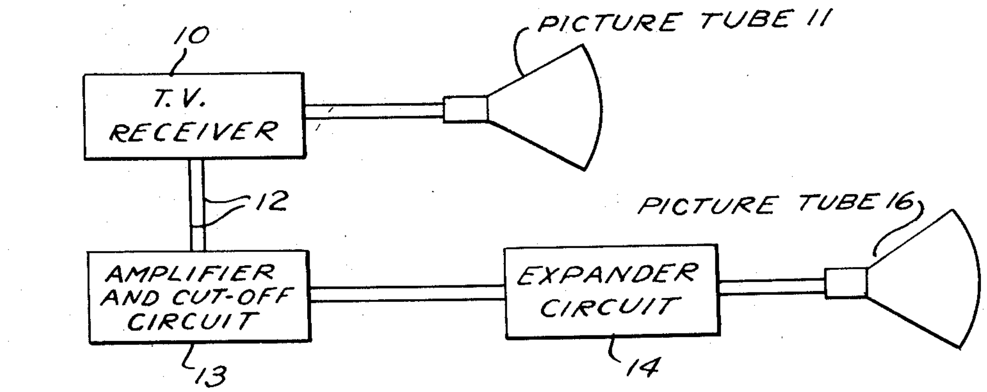
FIG. 2 is a similar block diagram of a receiver embodying the invention.

Referring to FIG. 2 a television receiver 10 of the usual type is adapted to receive the modulated carrier from the antenna 4 and to derive the synchronizing and picture signals therefrom and to supply such signals to a recever tube 11 where the upicture from the camera 1 is reproduced. The pulse signals are also applied to the picture tube 11 but for the reasons pointed out above do not appear on the screen of the tube 11.

The picture signal derived from the receiver 10 which combines the two picture signals, is supplied by lines 12 to an amplifier and cut off circuit 13 in which the signals of the amplitude of the picture signal from the camera 1 are eliminated and only the signals of greater amplitude from the camera 5 are allowed to pass. These signals are fed to an expander circuit 14 wherein the short pulses are expanded in duration to include the time period of the initial pulses and the interval between such pulses, thereby producing a picture signal of the type suited to actuate a receiver tube. This expanded picture signal together with the synchronizing signal from the receiver 10 is applied to a picture tube 16 and reproduces thereon the picture derived from the camera 5.

A feature of the present ivention is the use of a standard television channel, without interfering with the picture being received on a standard receiver for the simultaneous transmission of a second picture which is not visible on the standard receiver but is made available on a special receiver designed for the purpose. The second picture cannot be received by unauthorized persons and even the presence of the second signal will not be detected by observing the picture on the standard receiver tube.

What is claimed is:

1. A multiplex television system comprising a first television camera adapted to produce picture signals and synchronizing signals, a television transmitter, means modulating said transmitter by said picture signals and said synchronizing signals, a second television camera adapted to produce picture signals, means synchronizing said second camera with said first camera, a pulse generator adapted to produce a series of pulses of short duration and spaced by an amount greater than a pulse length, said pulses having an amplitude greater than said first picture signal, means modulating said pulses by the picture signal from said second camera in a time sequence coincident with the picture signal from said first camera, means modulating said transmitter by said modulated pulses, a receiver adapted to receive and demodulate the carrier wave from said transmitter and to derive therefrom synchronizing signals and a picture signal having said pulse signals superimposed thereon, cutoff means to remove from said combined signals the lower amplitude picture signal, leaving only said pulse signal, means expanding said last signals in duration to include the interval between pulses and produce thereby a continuous picture signal suited to actuate a television receiver tube, a television receiver tube, and means applying said last signals and said synchronizing signals to said last tube for reproducing thereon the picture derived from said second camera.

2. A system for superimposing a second television picture signal on a first television picture signal without interfering with the picture produced by said first picture signal, which comprises means forming a series of pulses having a duration less than the persistence of the luminescense on the screen of a television receiver tube and separated in time by an amount greater than the duration of each pulse and having an amplitude greater than that of said first picture signal, means modulating said pulses by said second picture signal, means superimposing said modulated pulses on a television transmission channel in a time sequence coinciding with the first picture signal, means separating said pulses from the first picture signal in a receiver, means expanding said pulses in time to form a picture signal suited to operate a television receiver tube, and means producing on said tube a picture derived from said last picture signal.

3. A receiver for receiving a multiplex television signal wherein a carrier is modulated by a first picture signal and by synchronizing signals and by a second picture signal in the form of a series of short pulses spaced by a time interval greater than the pulse duration and coinciding in time with the first picture signal and having a pulse amplitude greater than the amplitude of the first picture signal, said receiver comprising means to receive and demodulate said carrier wave, and to derive therefrom synchronizing signals and a picture signal having said pulse signals superimposed thereon, cutoff means to remove from said combined signals the lower amplitude picture signal, leaving only said pulse signal, means expanding said last signals in duration to include the interval between pulses and produce thereby a continuous picture signal suited to actuate a television receiver tube, a television receiver tube, and means applying said last signals and said synchronizing signals to said last tube for reproducing thereon the picture derived from said second picture signal.

References Cited in the file of this patent

UNITED STATES PATENTS

| | | |
|---|---|---|
| 2,333,969 | Alexanderson | Nov. 9, 1943 |
| 2,437,300 | Labin | Mar. 9, 1948 |
| 2,527,967 | Schrader | Oct. 31, 1950 |
| 2,686,220 | Sziklai | Aug. 10, 1954 |
| 2,874,213 | Beers | Feb. 17, 1959 |